Nov. 5, 1968  R. D. HALE ETAL  3,408,798
MEANS FOR AUTOMATICALLY LEVELING A VEHICLE
Original Filed May 26, 1965  4 Sheets-Sheet 1

INVENTOR.
RALPH D. HALE
BYRON L. MORRIS
BY
M. Y. Charles
ATTORNEY

Nov. 5, 1968    R. D. HALE ET AL    3,408,798
MEANS FOR AUTOMATICALLY LEVELING A VEHICLE
Original Filed May 26, 1965    4 Sheets-Sheet 2
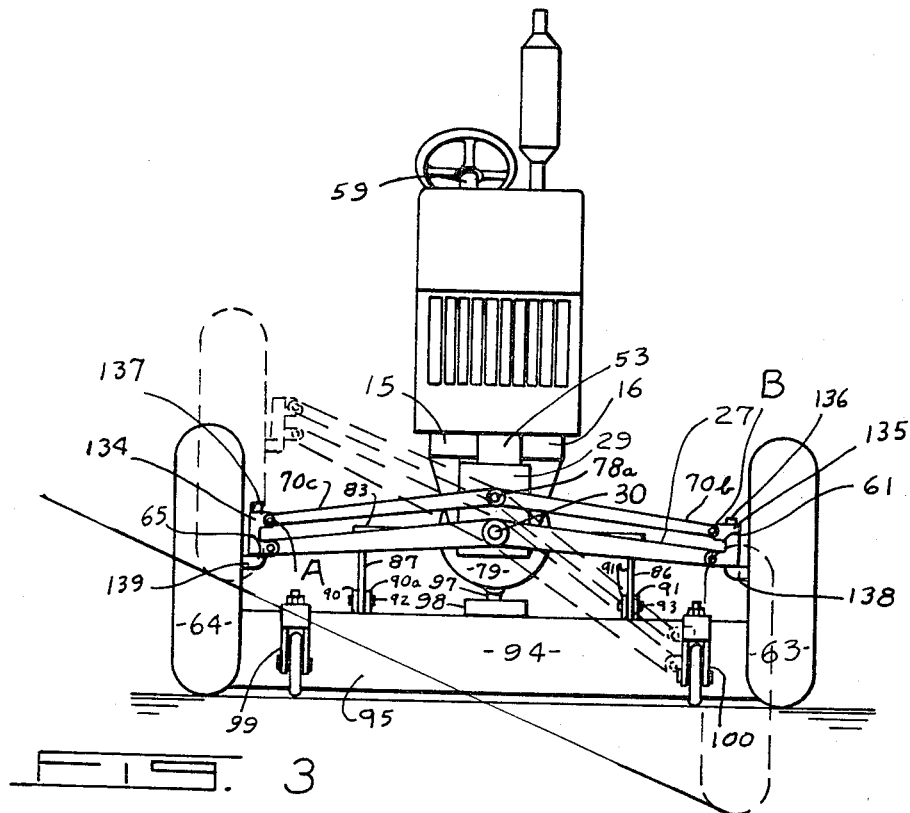
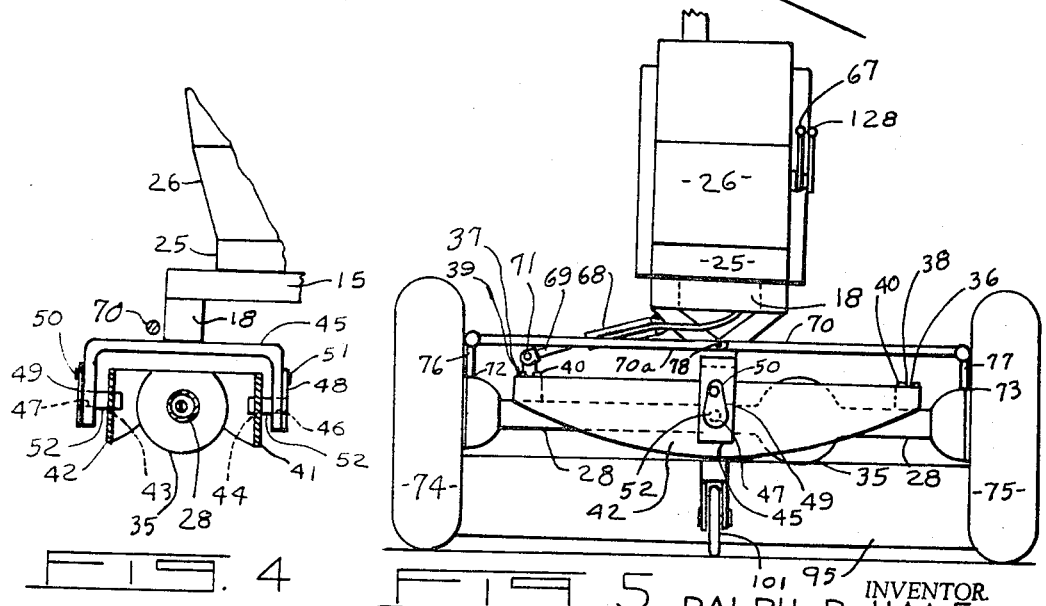
INVENTOR.
RALPH D. HALE
BYRON L. MORRIS
BY
M. Y. Charles
ATTORNEY

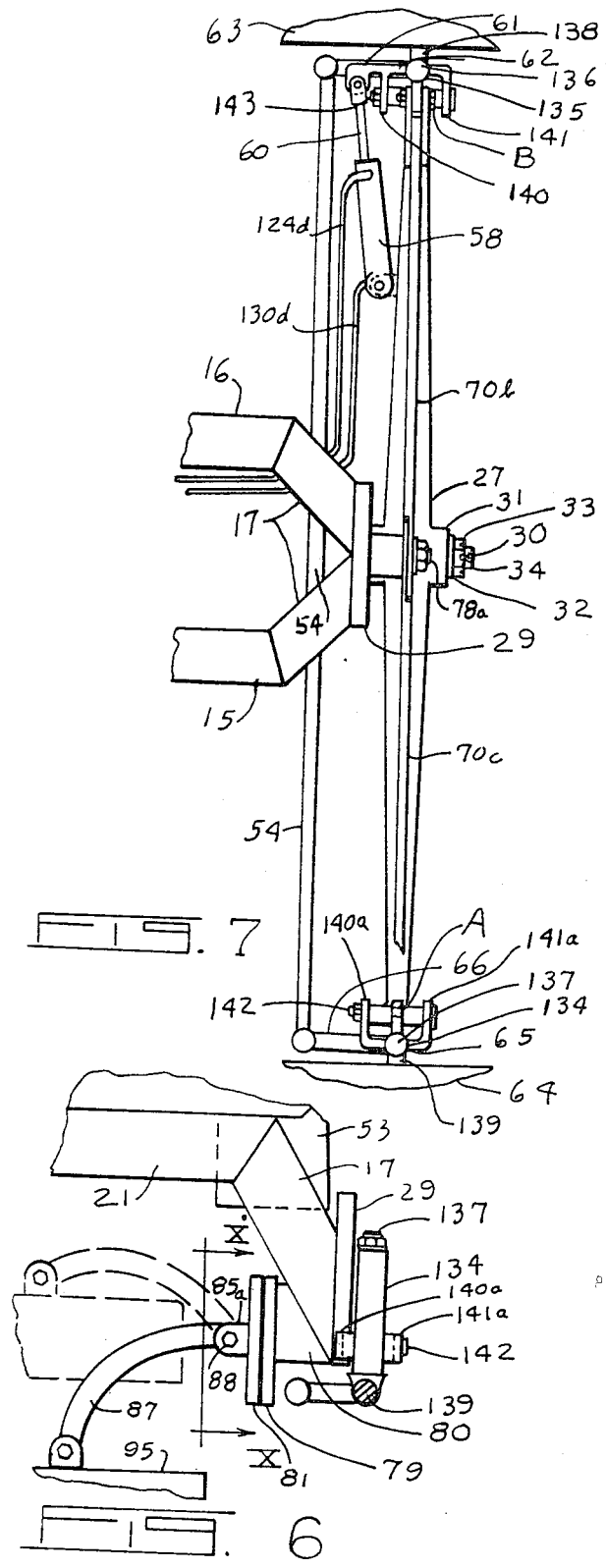

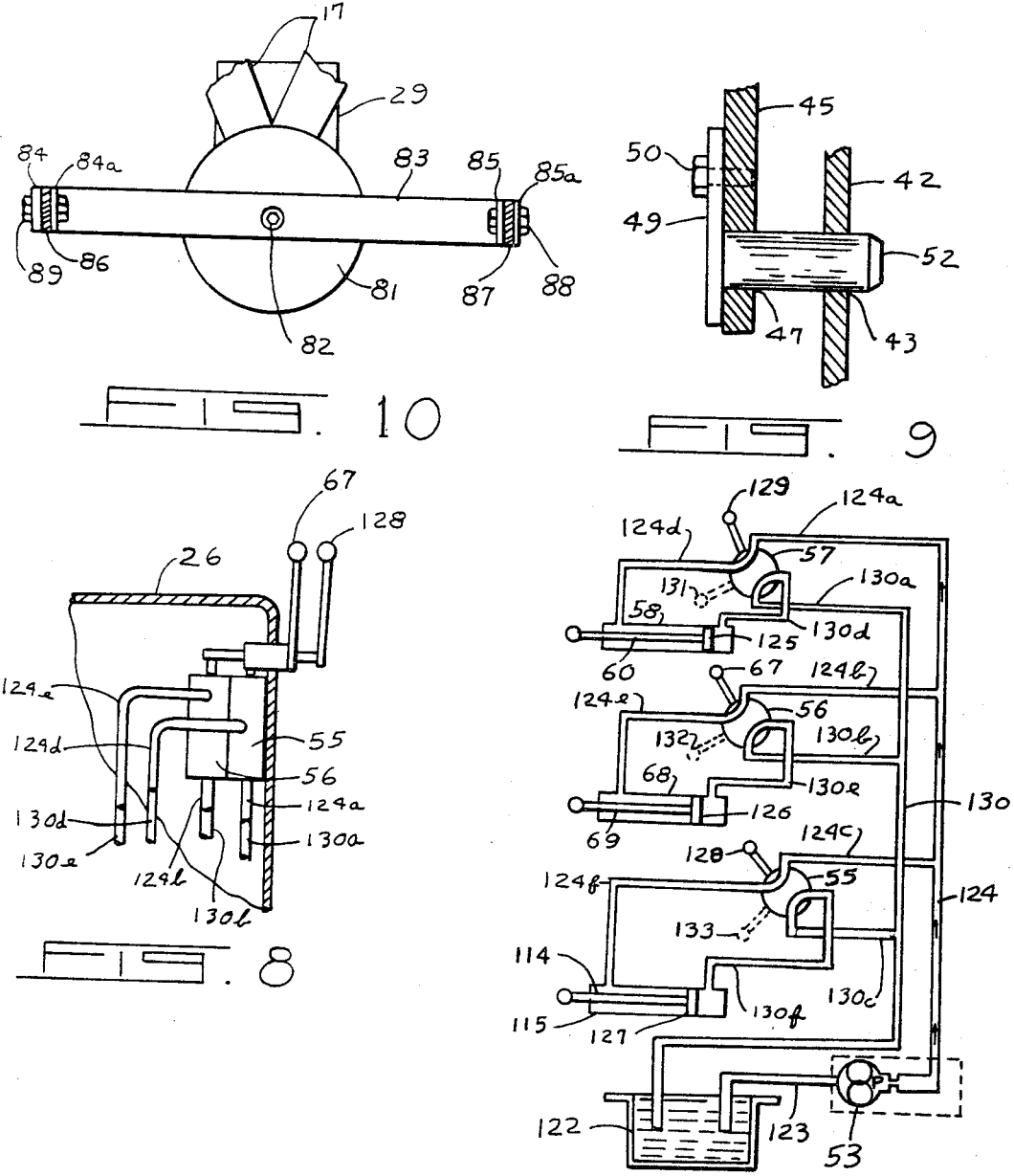

3,408,798
MEANS FOR AUTOMATICALLY LEVELING
A VEHICLE
Ralph D. Hale, Carthage, Mo., and Byron L. Morris, Wichita, Kans., assignors to Slope Tractor, Inc., Harper, Kans., a corporation of Kansas
Continuation of application Ser. No. 459,069, May 26, 1965. This application June 13, 1967, Ser. No. 655,257
6 Claims. (Cl. 56—25.4)

ABSTRACT OF THE DISCLOSURE

A vehicle for carrying a mower or the like for use on a sloping surface wherein the frame of the vehicle is pivotally attached to its supporting axle and steering structure in such a manner that the frame may be maintained in a level, upright position while the axles and mower are maintained parallel to the sloping surface, with the wheels of the vehicle being maintained in a vertical position, there being hydraulic apparatus for tilting the frame with respect to the axles and maintaining the mower in its desired relative position.

Cross references

This is a continuation of our application Ser. No. 459,069, now abandoned, filed May 26, 1965, and entitled, "Means for Automatically Leveling a Vehicle."

This invention relates to means for adjustably leveling the frame of a vehicle that is supported on a sloping terrain. The vehicle herein referred to is more particularly a tractor or mowing machine designed to operate on the sloping banks or sides of a trafficway for the purpose of mowing grass and the like that may be growing along the sides of the trafficway.

The difficulty has been, that to run a tractor or mowing machine along a sloping surface the tractor or mowing machine is tipped one side higher than the other, and if the bank is steep enough it will tip the tractor or mowing machine over on its side. In other words, the tractor or mowing machine cannot be used in such a place. Further, even though the slope of the bank may not be steep enough to tip the machine, it will tip the machine enough that it will be difficult for a person riding the machine to stay on the machine and the slope might even be enough that it would interfere with the proper running of an engine that would be carried on the frame of the machine for power purposes as would readily be understood.

Therefore, it is an object of this invention to provide a mower carrying tractor like vehicle wherein, as the carrying wheels of the tractor run onto the sloping ground the axle or supporting members of the tractor will take on a sloping position substantially parallel with the ground and as the sloping position develops the supporting wheels for the tractor may be adjusted to a vertical position and simultaneously the frame of the tractor will be adjusted to a horizontal or substantially level position and the sickle or mowing portion of the tractor will be carried in a position substantially parallel with the ground.

A further object of the invention is to provide a device of the kind mentioned in which the above-mentioned adjustments are made manually by the operator of the tractor; however, if desired, and as is also shown in the drawings these adjustments can be made automatically.

A still further object of the invention is to provide a machine of the kind mentioned which is simple in construction, one that is comparatively cheap to manufacture, one that is highly efficient in its performance, as well as being one that is sturdy and strong in structure and is long-lived.

A still further object of the invention is to provide a machine of the kind mentioned in which the sickle or mowing portion of the machine can be raised well above the ground for transport purposes. These and other objects of the invention will be more fully explained as the description progresses.

Referring now to the accompanying drawings in which similar numerals of reference designate the same parts throughout the several figures of the drawings:

FIG. 3 is a front elevational view of the machine;

FIG. 4 is a sectional detailed view through a portion of the machine, the view being as seen from the line IV—IV of FIG. 2 and looking in the direction of the arrows;

FIG. 5 is a rear elevational view of the machine;

FIG. 6 is an enlarged, detail sectional view through another portion of the machine, the view being as seen from the line VI—VI in FIG. 2 and looking in the direction of the arrows;

FIG. 7 is an enlarged detail view of the front end of the machine and having parts removed therefrom for convenience of illustrating the front end frame leveling, steering, and the mechanism for maintaining the front wheels of the machine in a vertical position;

FIG. 8 is an enlarged sectional view through the seat showing the control means for the adjusting valves of the device, the view being as seen from the line VIII—VIII in FIG. 1 and looking in the direction of the arrows;

FIG. 9 is an enlarged, detail, sectional view illustrating the rear pivoted mounting of the frame relative to the supporting axle housing;

FIG. 10 is a cross-sectional view through the frame of the machine and showing the attaching means of a utility structure such as a mower to the machine, the view being as seen from the line X—X in FIG. 6 and looking in the direction of the arrows; and FIG. 11 is a schematic view illustrating the hydraulic system employed in operating the machine.

Figures 1, 2:
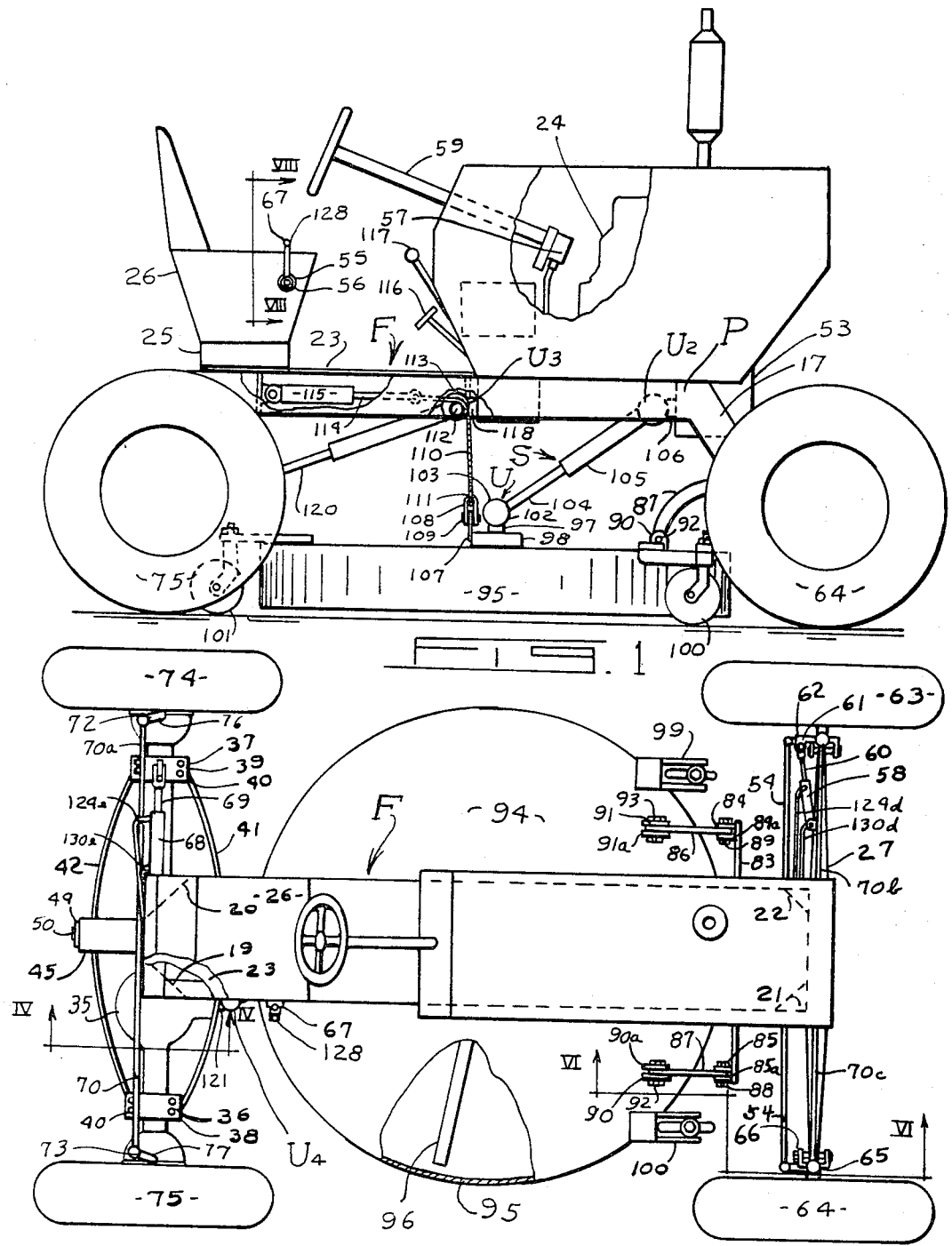
FIGURE 1 is a side view of the assembled machine.
FIG. 2 is a top plan view of the machine as shown in FIG. 1.

In the drawings, the machine is shown as having a rectangular-shaped frame F comprising preferably square tubular side members 15 and 16 and end members 17 and 18, all of which have their end portions fitted and welded together to form a rigid rectangular frame.

To further stiffen and make the frame F more rigid, the frame F may be provided with gusset plates 19, 20, 21 and 22 in each corner of the frame that are welded to their respective side and end frame members 15, 16, 17 and 18.

On the rear portion of the rectangular frame F is positioned a floor plate 23 that is substantially attached, preferably welded, to the frame members 15, 16, and 18. In the front portion of the rectangular frame F is carried a power unit preferably an internal combustion engine 24 that is supported on the side frame members 15 and 16 and the front end member 17. On the rear portion of the platform plate 23 is carried a seat supporting element 25, on the upper end of which is carried the seat 26.

The machine is pivotally carried on a front axle element 27 and on rear axle housings 28 connected by a differential element 35. The frame member F is provided with a front, depending and supporting plate 29 therefrom. On the lower portion of the supporting plate 29 is rigidly mounted a forwardly projecting pin 30. The front axle member 27 is I-shaped in cross section, and the top and bottom of the axle converge from the center thereof to the outer ends of the axle 27 and at the center of the axle and between the upper and lower legs on both sides of the web of the I is a boss element 31, which is a part of the forging of the axle, and in the center of the boss is a hole 32 in which is the pivot pin 30, so that the axle 27 can rock thereon. The outer end of the pivot pin 30 has a nut 33 threaded thereon, with a cotter pin 34 passed through the nut 33 and pin 30 so as to retain the nut 33 on the pin 30 and the nut 33 bears against the boss 31 to retain the axle member 27 in a rockable position on the pin 30. The outer ends of the tie rods 70b and 70c are pivotally attached to the upper ends of a pair of sleeve elements 134 and 135 at the points A and B. In the sleeve elements 134 and 135 are revolvably mounted kingpins 136 and 137 that are part of a steering knuckle 62 and 65 which also carry the wheel spindles 138 and 139 on which the front supporting wheels 63 and 64 are revolvably carried. On the lower end portion of each sleeve 134 and 135 is a pair of spaced-apart ear elements 140 and 141 and 140a and 141a between which is fitted the outer ends of the front axle 27. Pivot pins 142 and 143 pass through their corresponding ears and their respective axle end to form a pivoted mounting for the sleeves 134 and 135 so that as the frame F is leveled relative to the sloping position of the axle the tie rods 70b and 70c will automatically hold the sleeves 134 and 135 and their revolvable kingpins 136 and 137 in a vertical position to hold the front wheels in a vertical position even though the front axle 27 may be in a sloping position.

On either side of the differential case 35 are platform bearings 36 and 37 that are faced upwardly and are rigidly mounted on the axle housings 28. The machine is further provided with yoke support plates 38 and 39, one resting on each of the platform bearings 36 and 37, the plates each being rigidly bolted to their respective platform bearings by means of bolts 40. A pair of curved yoke members 41 and 42 are positioned one before and one behind the differential case 35. The ends of the yoke members 41 and 42 bear on the outer ends of their respective support plates 38 and 39 and are rigidly welded thereto. Each yoke member 41 and 42 is provided with a bearing or hole 43 and 44. The holes 43 and 44 are in axial alignment with each other and are positioned midway between the outer ends of the axle housings 28. Also, the holes 43 and 44 are inaxial alignment with the pivot pin 30 on the front end of the frame F.

The machine is further provided with a flattopped, U-shaped support element 45 on which the rear end frame member 18 of the frame F rests, the same being rigidly fixed, preferably welded, thereto. The legs of member 45 depend downward, are spaced from the outside faces of the yoke members 41 and 42 and are provided with holes 46 and 47 which register with the holes 43 and 44 of the yoke members 41 and 42. The lower end of each leg of the U-shaped element 45 is provided with a plate 48 and 49 that is rigidly attached thereto by means of bolts 50 and 51. Each plate 48 and 49 has one end of a pivot pin 52 integrally formed therewith, the pins passing through the holes 46 and 47 and 43 and 44 to form a pivotal mounting for the frame F on the rear axle housing portion 28 so that the frame F can freely rock from side-to-side about a center axis passing through the rear pivot pins 52 and the front pivot pin 30.

The machine is provided with a hydraulic pump 53 that is driven by the power unit 24. The pump 53 is a standard hydraulic pump of the type that is provided with pressure regulating bypass means whereby a constant amount of hydraulic pressure is maintained in the pressure line 124. Line 124 leads to and connects with each of three valves 55, 56, 57, one for power steering the tractor, one for rocking or leveling the frame F and also for adjusting the wheels to a vertical position and one for elevating and lowering the mower.

Front wheel 64 is carried on a steering knuckle 65 that is provided with a steering arm 66 and front wheel 63 is carried on a steering knuckle 62 that is provided with a steering arm 61 coupled with a power steering cylinder 58 by shaft 60. The outer ends of the steering arms 61 and 66 are connected by a tie rod whereby the two front wheels 63 and 64 move alike in the steering of the machine. The foregoing described power steering structure is only illustrative of the fact that the machine does have power steering but more efficiently designed power steering units that are already made can be used instead of that just described.

The machine is provided with an operating lever 67 positioned adjacent operator's seat 26 and the valve 56 is connected with the operating cylinder 68 that is carried on the frame F of the machine and has a piston 126 and piston rod 69 that is extensible from and retractable into the cylinder 68 as controlled by the valve 56. The outer end of the piston rod 69 is pivotally connected to the yoke support plate 39 at the point 71. At the outer ends of the axle housings 28 are horizontally operating knuckles 72 and 73 corresponding to rear drive wheels 74 and 75 respectively. On each of the knuckles 72 and 73 is an upwardly extending arm 76 and 77 respectively. The outer ends of a tie bar 70 and 70a are pivotally connected one to each of the upper ends of the upwardly projecting arms 76 and 77, and the inner ends of the tie bars 70 and 70a are pivotally mounted on a pivot pin 78 that is rigidly carried on the center portion of the rear frame cross member 18 so, as the tie bars 70 and 70a are moved longitudinally by the rocking movement of the frame F as a result of the leveling operation of the frame due to the piston rods 69 action at the cylinder 68, the wheels 74 and 75 will be rocked to stand in parallelism with each other, but they will stand at complementary angles relative to the axle housing 28 so that if the axle housing 28 stands parallel with the sloping surfaces therebeneath the wheels 74 and 75 will stand parallel and vertical on that same sloping surface.

Similarly, at the front end of the frame F and at the center of the front depending plate 29 is a forwardly projecting pivot pin 78a, the rear end of which is rigidly fixed to the depending plate 29 at a spaced distance above pin 30, such distance being the same as the spaced distance between the two rear pivot points 52 and 78 so that as the frame F is rocked relative to the front axle 27 and the rear axle housing 28 the pivot pins 78 and 78a will move in like arcs of travel. Also, at the front end of the machine is a pair of tie bar elements 70b and 70c that are similar to the tie bars 70 and 70a on the rear end of the machine, one end of each of the front tie bars 70b and 70c being pivotally mounted on the front pivot pin 78a.

The machine is further provided with a mower and a mower-carrying structure which is attached to the tractor portion of the machine by a structure comprising a circular plate 79 that is vertically positioned and is rigidly attached (welded) to the front cross frame member 17 and is rigidly held in its position by a filler member 80 that is fitted between the circular plate 79 and the adjacent frame member 17.

The machine is further provided with a circular mower control plate 81, that bears against the first said circular plate 79 and the two plates 79 and 81 are pivotally held together by means of a pivot bolt 82 that passes through the center of the two plates 79 and 81 whereby the second plate 81 can revolvably move relative to the first plate 79.

Rigidly attached to the revolvable plate 81 is a supporting bar 83, the ends of which extend outwardly from the edge of the circular plate 81. On each of the outer ends of the supporting bar 83 is rigidly fixed a pair of spaced-apart and rearwardly directed ear-like elements 84 and 84a and 85 and 85a. Between each pair of ears is positioned one end of a corresponding control arm 86 and 87, each of which is pivotally connected to its ears by pivot pins 88 and 89 that are passed through their respective ear elements 84 and 84a, and 85 and 85a and their respective control arm ends 86 and 87 so that the control arms 86 and 87 can rock up and down. The other end of each control arm 86 and 87 is positioned between pairs of ear-like elements 90 and 90a, 91 and 91a, and are pivotally attached thereto by means of pivot pins 92 and 93 that pass through their respective ear elements 90 and 90a, 91 and 91a and control arm ends 86 and 87 to form the pivotal mounting. The pairs of ear-like elements 90 and 90a, 91 and 91a are a rigid part of circular mower frame element 94 that has a depending skirt 95 therearound. Housed within the skirt 95 is a revolvable cutter blade 96 that is rigidly carried on a rotary drive shaft 97 that is revolvably carried in an antifriction bearing that is carried in a bearing housing 98 on the circular plate 94. The circular plate 94 is provided with three castor wheels 99, 100 and 101 that are designed to bear on any surface, either level or sloping, and support the circular plate 94, skirt 95 and cutting blade 96 therein parallel with the surface over which the machine is operating.

Rigidly mounted on the upper end of the drive shaft 97 is one half 102 of a universal joint structure U. The other half 103 of the universal joint structure U is rigidly mounted on the lower end of a second drive shaft 104 which is a part of a slip joint S which is extensible from and retractable into the drive sleeve 105 which will rotarily drive the second said drive shaft 104. The machine is provided with a second power unit P having a rotary drive shaft 106 that is revolvably connected to the slip sleeve 105 by means of a second universal joint structure U2. The circular plate 94 is provided with a rigidly attached (welded) upwardly extended ear-like element 107 and the legs of a clevis member 108 straddle the ear 107 and a pivot pin 109 is passed through the clevis and the ear 107 to form a pivotal attachment and mounting at the clevis 108 on the ear 107. One end of a flexible line 110 which may be a chain, cable or the like, is rigidly fixed at the point 111 to the upper part of the clevis 108, and the flexible line 110 extends upwardly and over a receiving sprocket or pulley 112 that is carried on a cross frame member 113 of the frame structure F and the remaining end of the flexible line 110 is rigidly attached to the outer end of the piston rod 114 of the cylinder 115, such that the extending and retracting movements of the piston rod 114 will lower or raise the circular plate 94 and its associated parts to a working position or a raised position for transport purposes.

The machine is provided with a major power unit 24, as previously mentioned, which furnishes power for the operation of the machine through the usual standard clutch and transmission, the details of which are not shown since they are well known, except that they are being used for the purposes herein described. The clutch is operated by the usual foot pedal 116 and the transmission is operated by standard gearshift lever 117. The shaft 118 on which is carried one side of a universal joint U3 and on the other side of which is carried one end of a slip drive shaft 120, the rear end of which rigidly carries one side of a fourth universal joint, the other side of which is carried on the outer end of differential jackshaft 121 from which power is delivered through the usual differential gearing and axle drive shafts. The axle drive shafts terminate in universal joint structures connecting between the axle drive shafts and the rear drive wheels 74 and 75 on either side of the machine and these last-mentioned universal elements are housed within the knuckle structure 72 and 73 on which the rear drive wheels 74 and 75 are carried. All this last-described structure has not been gone into in detail in the drawings except for the tilting motion of the wheels because it is all well known and previously used structure and is not claimed as a part of this invention except that it is being used for the purposes above described.

The machine is provided with a hydraulic operating system that is illustrated in FIG. 11, wherein a hydraulic pressure is set up by a pump 53 which is driven by the major power unit 24 and pumps hydraulic liquid from a reservoir 122 through the pipeline 123 and forces the fluid under pressure through the pressure line 124 to each of the control valves 55, 56, 57. Each of the cylinders 58, 68 and 115 are of the closed type whereby pressure may be introduced in either end of the cylinder to move the piston 125, 126 or 127 either forwardly or rearwardly in their respective cylinders 58, 68 and 115 to extend or retract their respective piston rods 60, 69 and 114 from and into their respective cylinders. It is, therefore, necessary for each cylinder to have a pipeline for and connected with each end of the cylinder, and in order to operate these cylinders it is necessary to have a four-way valve for the operation of each cylinder. These valves are illustrated in FIG. 11 and are shown as having operating levers 67, 128 and 129 which will turn their respective valves to reverse the pressure lines so that the line to one of the cylinders is a pressure line and the line to the other end of the cylinder becomes a return line leading to the return reservoir 122. If the operating lever were turned to a point midway of these two positions all valve parts would be closed and no movement of the piston and piston rods could take place either from internal or external forces. The pressure line 124 has three pressure takeoff lines 124a, 124b and 124c extending therefrom and the pressure line 124a serves the control valve 57; the pressure line 124b serves the control valve 56; and the pressure line 124c serves the control valve 55.

The system also includes a return line 130 that has branches 130a, 130b and 130c that service the return side of the control valves 55, 56 and 57, so that whichever way the valve is turned to force movement of the pistons in the cylinders the other line becomes the exhaust or return line for the other end of the cylinder.

As shown in FIG. 11, the operating lever of each valve is set in the position that the pressure is delivered from the pressure line through the valve and continues through the pressure lines 124d, 124e and 124f into the front end of each end of each cylinder whereupon the pistons 125, 126 and 127 in the cylinders would be moved rearwardly to retract the piston rods 60, 69 and 114 and the hydraulic liquid in the rear portion of the cylinder would be forced therefrom through the return pipes 130d, 130e and 130f to and through the valves 57, 56 and 55 and to the major return line 130 and back into the reservoir 122.

Now if the operating levers 67, 128 or 129 are turned to their dotted positions 132, 133 and 131, then the past arrangement in the valve would be reversed and pressure lines 124e, 124f and 124d would become return lines and the return lines 130e, 130f and 130d would become pressure lines and the pistons 126, 127 and 125 in the cylinders would be forced to move forward to extend their respective piston rods 69, 114 and 60 therefrom to operate their respective part of the machine as will later be described. Obviously, to set the operating lever midway between the two positions shown, all of the valve parts would be closed and no hydraulic liquid could flow either direction and the pistons and their respective piston rods would be locked in their adjusted position.

Now to use the device, the machine would be prepared for transporting the machine to the scene of operation or place where the machine is to be used by first starting the engine 24 and hydraulic pump 53 whereupon the mower 94 may be lifted to an elevated position by moving the valve lever 128 to cause the cylinder piston rod 114 to be retracted and thereby through the movement of the flexible line 110 attached thereto and also to the mower 94 to lift the mower 94 to an elevated position, whereupon the machine may be driven to a selected scene of operation which may be a sloping area either up or down perhaps along a road or highway or the like, and there the machine would be driven on the sloping area where normally the machine would stand in a tipped position, and would be difficult to ride or operate. To overcome this situation the valve lever 67 would be moved to operate the valve 56 to either extend or retract the piston rod 69 of the cylinder 68 so as to rock the frame F of the machine to a level position while the front axle 27 and the rear drive axle housing 28 would stand parallel to the sloping area and in this adjusting movement of the frame F, the tie bars 70, 70a and 70b and 70c would be operated to tilt all four of the supporting wheels of the machine to a vertical position so as to support and maintain the vertical equilibrium of the machine whereupon the operating handle 128 would be moved to operate the control valve 55 which, in turn, will cause the piston rod 114 of the cylinder 115 to be extended from the cylinder and lower the mower to such a position that the supporting caster wheels 99, 100 and 101 will bear on the sloping surface beneath the machine to support the mower in a working position properly spaced above and parallel with the sloping surface therebeneath. In taking this position, the mower structure will move about its pivotal mounting 82 to assume the adjusted position and this having been done the operating handle will be moved to apply power P to the cutting blade 96 of the mower to drive the cutting blade 96 in a rotary motion for cutting purposes as the machine is driven over the sloping surface to be mowed.

When the mowing operation is completed and the machine is moved back onto a level surface the operation above described would be operated in reverse so as to again move the frame of the machine to a level position and readjust the supporting wheels to their vertical position and the mower portion of the machine would be raised to an elevated position and the machine is then ready to travel to a new place of operation where the same adjustments will be made as before.

Now while the machine as shown and described is probably the preferred form of the machine, it is to be understood that such modification of the machine may be employed as lie within the scope of the appended claims without departing from the spirit and intention of the invention.

Having thus described the invention, what is claimed as new and desired to be secured by Letters Patent is:

1. A leveling means for vehicle frames; a vehicle, said vehicle having a rigid frame member, a front axle member and a rigid rear drive axle and a differential gear housing member, said frame member having support members rigidly carried thereby, one at each end of the said frame and at the midpoint between the sides of said frame member and extending downwardly therefrom, said support members being rockably carried on pivot elements at their lower ends, said pivot elements being carried one by and at the midpoint of the said front axle and one by and midway between the outer ends of the said drive axle and differential gear housing member, transversely rockable supporting knuckles, one for, at and pivotally carried by the outer ends of the said front axle member and the said rear drive axle and differential housing member, means supported by the said supporting knuckles on the front axle member and being adjustable horizontally for steering purposes of the vehicle, the last-named means and each of the said knuckles for the rear drive axle having a supporting wheel for the said vehicle revolvably mounted thereon, each of the said means supported by the supporting knuckles on the said front axle member having a steering arm rigidly carried thereon and being swingable in a horizontal plane, a pair of front tie rods, one end of each of the said pair of front tie rods being pivotally attached to the front supporting member of the said frame member and at a point spaced a distance above the pivotal mounting point of the support member on the front axle member, the said tie rods extending in opposite directions from each other and the outer ends of the tie rods being pivotally connected to one end of a transversely swingable member of their respective supporting knuckle for the transverse swinging movement of the knuckle and supporting wheel carried thereon, a second pair of tie rods, one end of each of the second said pair of tie rods being pivotally connected to the said rear frame supporting member at a point spaced above the pivotal mounting point of the rear frame supporting member, the distance between the two pivotal points on the front and rear frame-supporting members being equal, each tie rod of the second said pair of tie rods extending in opposite directions from each other, and the outer end of each tie rod being pivotally connected to the upper end of a transversely rockable member that is rigidly carried on said transversely rockable knuckle at each end of the drive axle and differential gear housing member so as to hold the wheels carried by the knuckles in a position of 90° to the plane of the said frame member regardless of any horizontal or sloping degree of the said drive axle and differential gear housing member, and extensible and retractable means connected between the frame member and members rigidly carried on the said drive axle housing to adjustably hold the said frame member in a level position regardless of the level or sloping position of the said drive axle and differential gear housing member, said frame member having a power unit and power delivery transmission unit carried thereon for powering the machine, and a differential unit carried in the same differential gear housing member and connected to oppositely disposed drive axle elements each of which universally connect with their respective drive wheel on the said knuckles at each end of the drive axle housing, and rotatable drive means connecting between the said differential unit and the said power delivery transmission unit, and seat means on said frame member for carrying an operator of the machine, a power operating system for operating the several adjustments and operations of the machine, said powered operating system being carried on the same frame member of the machine, and powdered operating system control means for the operation thereof, said control means being accessibly located relative to the said operator's seat, said frame member having attachment means carried thereon for attaching the utility structures thereto for operation.

2. The invention as set forth in claim 1, said vehicle having a rotary mowing structure thereon, said mowing structure being tiltably attached to the said utility attachment means of the said frame and being supported on rollable elements carried by the said mowing structure so as to adjust the utility structure into parallelism with the surface on which the vehicle travels and the surface over which the utility structure is to operate, and power means carried by the said frame member and connected with the utility structure for lowering and raising the utility structure to a working or transporting position.

3. The invention as set forth in claim 1, said powered system being a pressurized hydraulic system.

4. A vericle for carrying utility mechanisms; said vehicle being designed to work over and be supported on laterally sloping areas relative to the longitudinal axis of the vehicle, said vehicle having a frame member, said frame member being sidewise rockably supported on front and rear transversely positioned support elements for the frame member, said support elements each having laterally rockable support knuckles carried one on each end thereof for the support thereof, each of said knuckles having a wheel revolvably carried thereon for the support of the vehicle, and means connecting between the frame supporting members and the said knuckles for rocking the said knuckles to vertically position the said wheels where the said frame member is in a horizontal position, means carried by the frame members and connected to other supporting members for the frame member for moving the frame member in a horizontal position regardless of the horizontal or sloping position of the said supporting members therefor; a utility mechanism attachment bracket plate, said utility attachment bracket plate being rigidly carried on the said frame member intermediate the ends thereof and being transversely disposed relative to the length of the frame member; a swivel plate, said swivel plate being pivotally attached to the said utility attachment bracket and being in revolvable engagement therewith; utility mechanism attachment links, said links being spaced apart and one end of each of said attachment links being pivotally attached to the said swivel plate, said attachment links extending rearwardly from the said swivel plate; a utility mechanism, said utility mechanism having a housing element, the other end of each of said attachment link being pivotally attached to the said utility housing element; means carried by the said frame member and attached to the said utility housing element for raising and lowering the said utility mechanism from and into working positions; and a plurality of caster wheels, said caster wheels being carried on the said utility mechanism on and over the area to be worked by the said utility mechanism.

5. A vehicle comprising:
a frame;
a pair of spaced axle members pivotally carried by said frame;
supporting wheel assemblies carried by each of said axle members;
means for leveling said frame with respect to said axle members when the vehicle is on a sloping surface whereby said frame may be maintained in a horizontal position when said axles are inclined on said sloping surface;
a mower unit carried beneath said frame;
first means coupling said mower unit with said vehicle in such a manner that said mower unit may be moved in a vertical path with respect to the frame; and
second means coupling said mower unit with said vehicle in such a manner that said mower unit may swing with respect to said frame to an inclined position when the vehicle is on a sloping surface to thereby assume a position substantially parallel with said surface.

6. A vehicle as set forth in claim 5, said second means including link means coupling said mower unit to said vehicle whereby said mower unit may swing to said inclined position when the axles are inclined on a sloping surface.

References Cited

UNITED STATES PATENTS

| | | | |
|---|---|---|---|
| 2,622,894 | 12/1952 | Keeler | 280—95 |
| 2,821,059 | 1/1958 | Heitshu | 56—209 |
| 2,920,636 | 1/1960 | Gassner | 137—45 |
| 2,949,004 | 8/1960 | Jones | 56—25.4 |
| 3,160,221 | 12/1964 | Boone | 180—41 |
| 3,199,276 | 8/1965 | Hahn | 56—25.4 |

RUSSELL R. KINSEY, *Primary Examiner.*